(12) United States Patent
Hoh (10) Patent No.: US 7,108,232 B2
(45) Date of Patent: Sep. 19, 2006

(54) HELICOPTER FORCE-FEEL AND STABILITY AUGMENTATION SYSTEM WITH PARALLEL SERVO-ACTUATOR

(76) Inventor: Roger H. Hoh, 26826 Rolling Vista Dr., Lomita, CA (US) 90717

( * ) Notice: Subject to any disclaimer, the term of this patent is extended or adjusted under 35 U.S.C. 154(b) by 30 days.

(21) Appl. No.: 10/772,990

(22) Filed: Feb. 5, 2004

(65) Prior Publication Data

US 2005/0173595 A1 Aug. 11, 2005

(51) Int. Cl.
*B64C 13/16* (2006.01)

(52) U.S. Cl. ...................................... 244/223; 244/234

(58) Field of Classification Search ................ 244/220, 244/221, 75 R, 223, 229, 234
See application file for complete search history.

(56) References Cited

U.S. PATENT DOCUMENTS

| 3,750,984 | A | * | 8/1973 | Mouttet et al. ............ 244/76 R |
| 4,228,386 | A | * | 10/1980 | Griffith ....................... 318/628 |
| 4,345,195 | A | * | 8/1982 | Griffith et al. .............. 318/628 |
| 4,382,283 | A | | 5/1983 | Clelford et al. |
| 4,664,346 | A | * | 5/1987 | Koenig ........................ 244/223 |
| 5,062,594 | A | | 11/1991 | Repperger |
| 5,863,012 | A | | 1/1999 | Rollett et al. |
| 6,325,331 | B1 | | 12/2001 | McKeown |
| 6,334,592 | B1 | | 1/2002 | Tomio et al. |

* cited by examiner

*Primary Examiner*—Timothy D. Collins
(74) *Attorney, Agent, or Firm*—Knobbe Martens Olson Bear LLP (57) ABSTRACT

A force-feel system is implemented by mechanically coupling a servo-actuator to and in parallel with a flight control system. The servo-actuator consists of an electric motor, a gearing device, and a clutch. A commanded cockpit-flight-controller position is achieved by pilot actuation of a trim-switch. The position of the cockpit-flight-controller is compared with the commanded position to form a first error which is processed by a shaping function to correlate the first error with a commanded force at the cockpit-flight-controller. The commanded force on the cockpit-flight-controller provides centering forces and improved control feel for the pilot. In an embodiment, the force-feel system is used as the basic element of stability augmentation system (SAS). The SAS provides a stabilization signal that is compared with the commanded position to form a second error signal. The first error is summed with the second error for processing by the shaping function.

5 Claims, 5 Drawing Sheets

HELICOPTER FORCE-FEEL AND STABILITY AUGMENTATION SYSTEM WITH PARALLEL SERVO-ACTUATOR

STATEMENT OF GOVERNMENT INTEREST

This invention was made with Government support under contract NAS2-01029 awarded by NASA. The Government has certain rights in this invention.

FIELD OF THE INVENTION

The present invention relates to the field of vehicle control systems. More specifically, the present invention relates to helicopter flight control systems, stability augmentation systems (SAS), force-feel systems, and autopilots to improve handling qualities and reduce pilot workload.

BACKGROUND

Helicopters are well known to be inherently unstable and therefore difficult to fly, especially in conditions of degraded visibility and when the air is turbulent. Large helicopters employ force-feel systems and stability augmentation systems (SASs) to improve flying qualities and thereby simplify the flying task. Force-feel systems and SASs are not offered on smaller helicopters because they are complex, heavy, and expensive.

Figure 1:
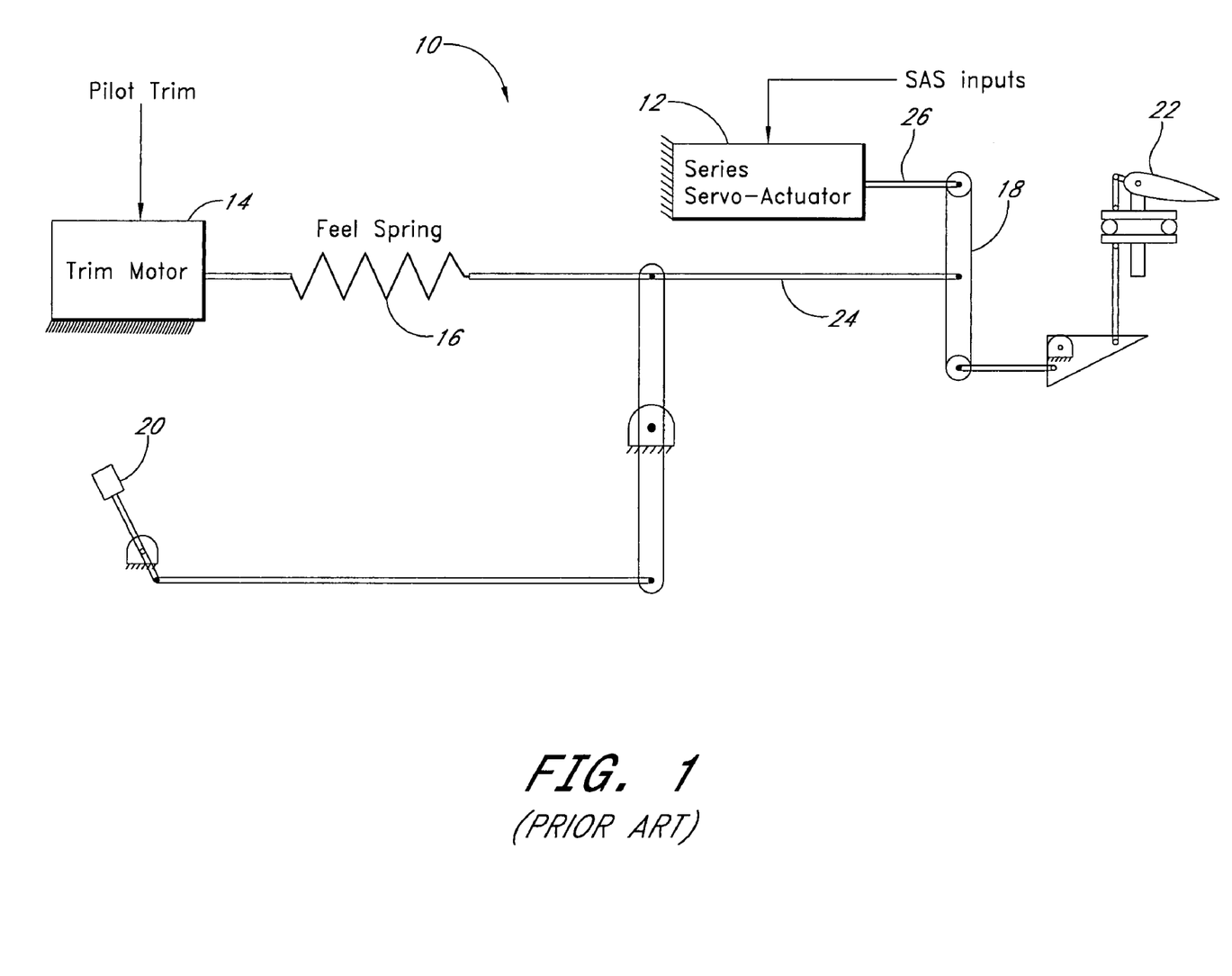
FIG. 1 is a schematic diagram illustrating a conventional helicopter SAS and force-feel system.

FIG. 1 illustrates a conventional helicopter system 10 with a SAS that includes a force-feel system. The SAS includes a series servo-actuator 12, a trim-motor 14, a feel-spring 16, and a linkage 18 that is inserted between the pilot's cockpit-flight-controller 20 and the flight control surface 22. Thus, the SAS is implemented in series with the flight control system.

The forces felt by the pilot's hand on the cockpit-flight-controller 20 depend on the feel-spring 16 and trim-motor 14. The output of the trim-motor 14 controls the reference point for the feel-spring 16. The pilot controls the output of the trim-motor 14 by using a trim-switch (not shown) typically located on the cockpit-flight-controller 20. The input to the flight control surface 22 includes the sum of the position of the cockpit-flight-controller 20 via a link 24 and the series servo-actuator 12 via a link 26.

Signals transmitted by the SAS (i.e., SAS inputs) to the series servo-actuator 12 include angular rate and/or attitude feedbacks that are intended to damp or stabilize the motions of an unstable helicopter. The effect of the SAS inputs to the series servo-actuator 12 are transmitted to the flight control surface 22 via the mechanical linkages 18 and 26. The linkage 18 is designed so that SAS feedbacks are not felt by the pilot at the cockpit-flight-controller 20. The absence of any forces on the cockpit-flight-controller 20 due to the SAS inputs to the series servo-actuator 12 is an objective of the series implementation. The need for a complex flight control linkage 18, a trim-motor 14 and a feel-spring 16 make the series implementation of a force-feel system and SAS unsuitable for use on light helicopters due to excessive weight and cost.

It is difficult and costly to retrofit an existing helicopter with a conventional force-feel system or SAS. As illustrated by the linkage 18 in FIG. 1, conventional systems require that apparatus be inserted into a break in the existing flight control system. Unless a helicopter already has a series servo-actuator 12 and linkage 18 installed, this is a significant and costly modification. Typically, a series servo-actuator 12 and linkage 18 are found only in large and complex helicopters. For these reasons, conventional systems are not deemed suitable for installation in light helicopters.

Figure 2:
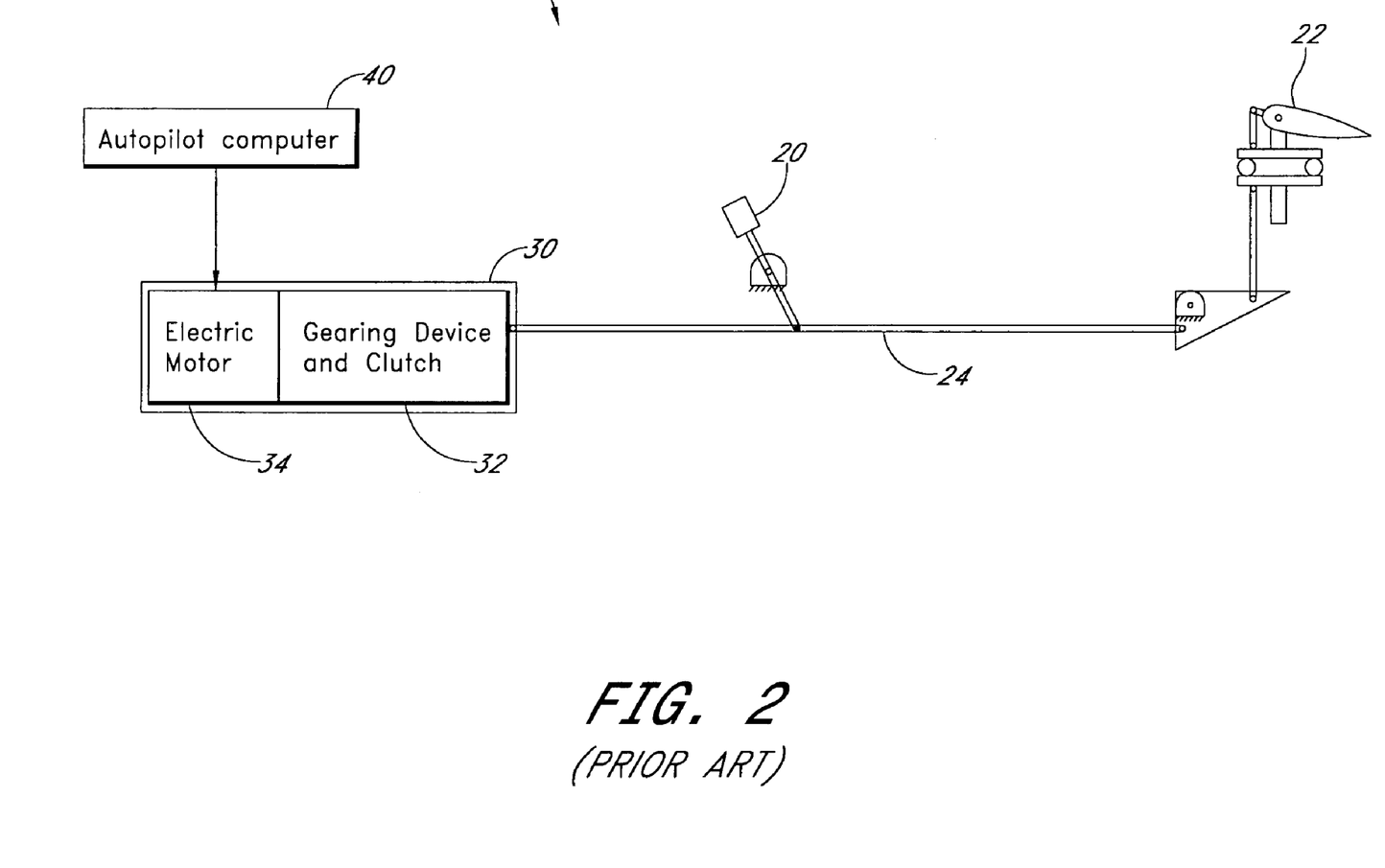
FIG. 2 is a schematic diagram illustrating a conventional autopilot system used on aircraft.

FIG. 2 illustrates a conventional autopilot system 28 used on helicopters and airplanes. Compared to the system 10 shown in FIG. 1, the conventional autopilot system 28 utilizes a less-complex parallel servo-actuator 30 implementation. The servo-actuator 30 is mechanically attached directly to and in parallel with an existing flight control system without any modification to the linkage 24 between the cockpit-flight-controller 20 and the flight control surface 22. The servo-actuator 30 includes a gearing device and clutch assembly 32 and an electric motor 34. When the autopilot is engaged, the servo-actuator 30 moves the flight controls 20, 22, 24 to achieve a response commanded by an autopilot computer 40. High gear ratios are employed in the gearing device and clutch assembly 32 to reduce the size of the electric motor 34. The gearing device and clutch assembly 32 exhibits moderate freeplay in typical autopilot systems.

The combination of high gearing and freeplay results in heavy cockpit flight control forces and undesirable looseness in the controls if the pilot attempts to override the autopilot. Thus, the combination results in very objectionable handling qualities if the pilot attempts to control the vehicle manually with the autopilot engaged. Therefore, conventional force-feel systems and SASs designed to augment manual control employ the more complex series mechanization illustrated in FIG. 1.

The conventional autopilot system 28 shown in FIG. 2 may include an override spring (not shown) between the autopilot servo-actuator 30 and the cockpit-flight-controller 20. The purpose of the override spring is to allow the pilot to make minor corrections to the aircraft attitude or flight path without disengaging the autopilot, and to return to automatic flight without having to reestablish trim. The force vs. deflection gradient of the override spring must be sufficiently large so that the autopilot servo-actuator 30 can drive the cockpit-flight-controller 20 without introducing additional dynamics due to the override spring. However, such a large spring does not provide satisfactory control feel for a force-feel system or SAS where full time manual control is the objective. Another disadvantage of such systems is that a mechanism (not shown) is required to disconnect the override spring from the flight control system when the autopilot is turned off. Such a mechanism adds weight and must be carefully designed to ensure that it will not fail in a way that it cannot be disconnected from the flight control system. Thus, a mechanical spring is not deemed suitable as a means to provide a parallel force-feel system or SAS.

Tactile feedback enhances the control feel of aircraft. One of the feedbacks to the cockpit-flight-controller that can be used to accomplish improved tactile feel is the position of the cockpit-flight-controller itself. This is commonly done in fly-by-wire systems (not shown) where the flight controller is not mechanically connected to the flight control system. Rather, a flight controller in a fly-by-wire system transmits electrical signals to a servo-actuator which is connected in series, such as the servo-actuator 12 shown in FIG. 1. That is, by contrast to the system 10 shown in FIG. 1, a fly-by-wire system replaces the mechanical link 24 with an electrical connection (i.e., a wire) that transmits a signal directly to the servo-actuator 12. Some fly-by-wire systems replace the feel spring 16 in FIG. 1 with complex algorithms that are intended to improve the tactile feel of the cockpit-flight-controller 20. However, such systems are intended for complex, highly augmented, fly-by-wire aircraft and are not deemed suitable for use on light helicopters.

SUMMARY

The present invention provides a force-feel system for aircraft, such as helicopters and airplanes, and other user controlled systems. A feedback loop around a cockpit-flight-controller performs the function of the feel spring and trim-motor of a conventional series SAS. This parallel implementation allows a pilot to back-drive the servo-actuator using the cockpit-flight-controller while the force-feel system and SAS are engaged, or if they fail to disengage. The resulting motions and force-gradient of the cockpit-flight-controller are tailored to be favorable to the pilot. Thus, the need to modify the flight control system, the need to include a mechanical spring, and the need to include a trim-motor are all eliminated. This results in reduced weight and cost making it practical to implement a force-feel system and SAS in light helicopters.

The present invention provides a servo-actuator in the feedback loop around the cockpit-flight-controller. A trim switch is also provided that allows a pilot to command a desired cockpit-flight-controller position. An actual cockpit-flight-controller position is measured by a position sensor. The difference between the actual and commanded positions produces a first error which is processed by a shaping function. The shaping function correlates the first error to a commanded force at the cockpit-flight-controller.

In one aspect of the invention, the force-feel system functions as an element of a SAS. A commanded vehicle state is compared to the actual vehicle state, obtained from a sensor, to produce a second error. The first error and the second error are combined and processed by the shaping function to determine the commanded force at the cockpit-flight controller.

According to the foregoing, an embodiment includes a force-feel system for a helicopter which does not require a mechanical spring and a trim-motor. Thus, the weight and cost of the force-feel system are reduced, making it practical to implement a force-feel system and a stability augmentation system in light-weight helicopters. The system includes a feedback loop around a cockpit-flight-controller. The feedback loop is configured to apply a force to the cockpit-flight-controller proportional to a deflection of the cockpit-flight-controller from a desired position. The feedback loop includes a position sensor and a flight control device coupled to the position sensor. The position sensor is configured to measure an actual position of the cockpit-flight-controller The flight control device is configured to calculate the deflection and to determine the force based on a shaping function. The feedback loop also includes a servo-actuator mechanically connected to and in parallel with the flight control system. The servo-actuator is configured to apply the force to the cockpit-flight-controller and to be back-driven by the cockpit-flight-controller.

In an embodiment, a method provides tactile feedback to a cockpit-flight-controller mechanically coupled to a control surface in a helicopter. The method does not require apparatus to be inserted into a break in an existing flight control system and does not require the use of a mechanical spring and a trim-motor. Thus, the weight and cost of the force-feel system is reduced, making it possible to implement a force-feel system in light helicopters. The method includes measuring the position of the cockpit-flight-controller and receiving a signal from a trim switch proportional to a commanded position of the cockpit-flight-controller. The method also includes calculating the difference between the measured position and the commanded position, and asserting a force on the cockpit-flight-controller based on the difference between the measured position and the commanded position of the cockpit-flight- controller.

In an embodiment, a force-feel system for an aircraft having a cockpit-flight-controller configured to command a control surface is provided. The system includes a position sensor, a flight control device and an actuator. The position sensor is configured to measure a relative position of the cockpit-flight-controller. The flight control device is configured to command a force at the cockpit-flight-controller as a function of the relative position of the cockpit-flight-controller. The actuator is mechanically coupled to and in parallel with the cockpit-flight-controller and the control surface.

In an embodiment, a force-feel system for a helicopter is provided including a means mechanically coupled to a control surface for allowing a user to command the control surface, a means for determining a deflection of the means mechanically coupled to the control surface, and a means coupled to and in parallel with the means mechanically coupled to the control surface for providing feedback to the means mechanically coupled to the control surface, wherein the feedback is proportional to the deflection.

Other features and advantages of the present invention will become apparent to those of ordinary skill in the art through consideration of the ensuing description, the accompanying drawings, and the appended claims.

BRIEF DESCRIPTION OF THE DRAWINGS

A system and method which embodies the various features of the present invention will now be described with reference to the following drawings.

DETAILED DESCRIPTION OF THE PREFERRED EMBODIMENT

The present invention provides a force-feel system for aircraft, such as helicopters and airplanes, and other user controlled systems where a cockpit-flight-controller is mechanically linked to a control surface. In a helicopter, for example, a pilot may set the position of a cockpit-flight-controller to a desired location by pressing and releasing a trim switch. When the pilot moves the cockpit-flight-controller away from the desired location, a force is applied to the cockpit-flight-controller to resist the change. The force is determined by a shaping function configured to improve the tactile feedback to the cockpit-flight-controller. In an embodiment, the shaping function determines the force applied to the cockpit-flight-controller as a function of the cockpit-flight-controller's deflection from the desired location. In an embodiment, a force-feel system and SAS are used together to improve the tactile feedback to the pilot and the stability of the aircraft.

A servo-actuator is placed in a feedback loop around the cockpit-flight-controller resulting in a parallel implementation that allows the servo-actuator to be back-driven by the cockpit-flight-controller. The resulting motions and force-gradient of the cockpit-flight-controller are tailored to be favorable to the pilot.

A trim switch that is engaged by the pilot is provided to allow the pilot to command a desired cockpit-flight-controller position. An electrical signal from the trim switch is transmitted to a flight control device, such as a flight computer. The flight control device includes a trim algorithm that results in a numerical value corresponding to the commanded flight controller position. The actual cockpit-flight-controller position is sensed by a position-measuring device and the resulting electrical signal is transmitted to the flight control device. The flight control device contains an algorithm to calculate the difference between the commanded and actual cockpit-flight-controller positions and that quantity is processed by a shaping function. The shaping function allows the control feel characteristics of the cockpit-flight-controller to be improved.

The numerical values resulting from the shaping function calculation are transmitted from the flight control computer to a device that converts them to electrical energy that is then used to drive a small and lightweight electric motor. The electric motor shaft is mechanically coupled to a low-ratio, low-freeplay gearing device. The low gear-ratio allows the pilot to easily backdrive the flight controls while the trim switch is engaged, or if the SAS fails and the clutch does not disengage. The latter feature is a safety aspect of one embodiment of the present invention. If for some reason the clutch does not open when the force-feel system or SAS is disengaged, it allows the pilot to fly normally in the failed state. The low-freeplay gearing device allows the pilot to backdrive the cockpit-flight-controller without the undesirable loose feel found in conventional parallel systems that are used on autopilots.

A gearing device is mechanically coupled to a zero-freeplay clutch. When the force-feel system is turned off, the clutch disconnects the force-feel system from the helicopter flight control system. The use of a low-freeplay gearing device and zero-freeplay clutch provides desirable force-feel characteristics while the force-feel system is engaged. The cockpit-flight-controller forces felt by the pilot are improved by varying the shaping function to achieve good handling qualities, while at the same time ensuring that the design limits of the small and lightweight electric motor are not exceeded.

The commanded cockpit controller position is set equal to the existing cockpit controller position when the trim switch is engaged. When the trim switch is released, the commanded cockpit controller position is held constant at the value that existed at the time of release. During periods when the trim switch is engaged, the low gear-ratio of the gearing device allows the pilot to move the stick to a desired location by back-driving the gearing device and electric motor without encountering objectionable forces on the cockpit-flight-controller.

In an embodiment, the force-feel system functions as an element of an attitude-command-attitude-hold SAS. An attitude signal is obtained from an attitude gyro or similar device and transmitted to the flight control device. The numerical values of attitude are differenced with the numerical value of commanded attitude resulting in a numerical value called the attitude error. The attitude error values are processed by an equalization algorithm resulting in an attitude feedback. This feedback is multiplied by a gain and summed with the numerical value of the cockpit-flight-controller error. The combination is then processed by the shaping function. The equalization algorithm provides good stability. Depending on the inherent stability of the helicopter, feedback derived from rate gyros can be added to the attitude signal.

The commanded attitude is calculated when the trim switch is engaged. In an embodiment, when the attitude-command-attitude-hold SAS is operational, the current attitude is set equal to the commanded attitude as long as the trim switch remains engaged. When the trim switch is released, the commanded attitude is held constant.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known components and methods have not been described in detail so as not to unnecessarily obscure aspects of the present invention.

Figure 3:
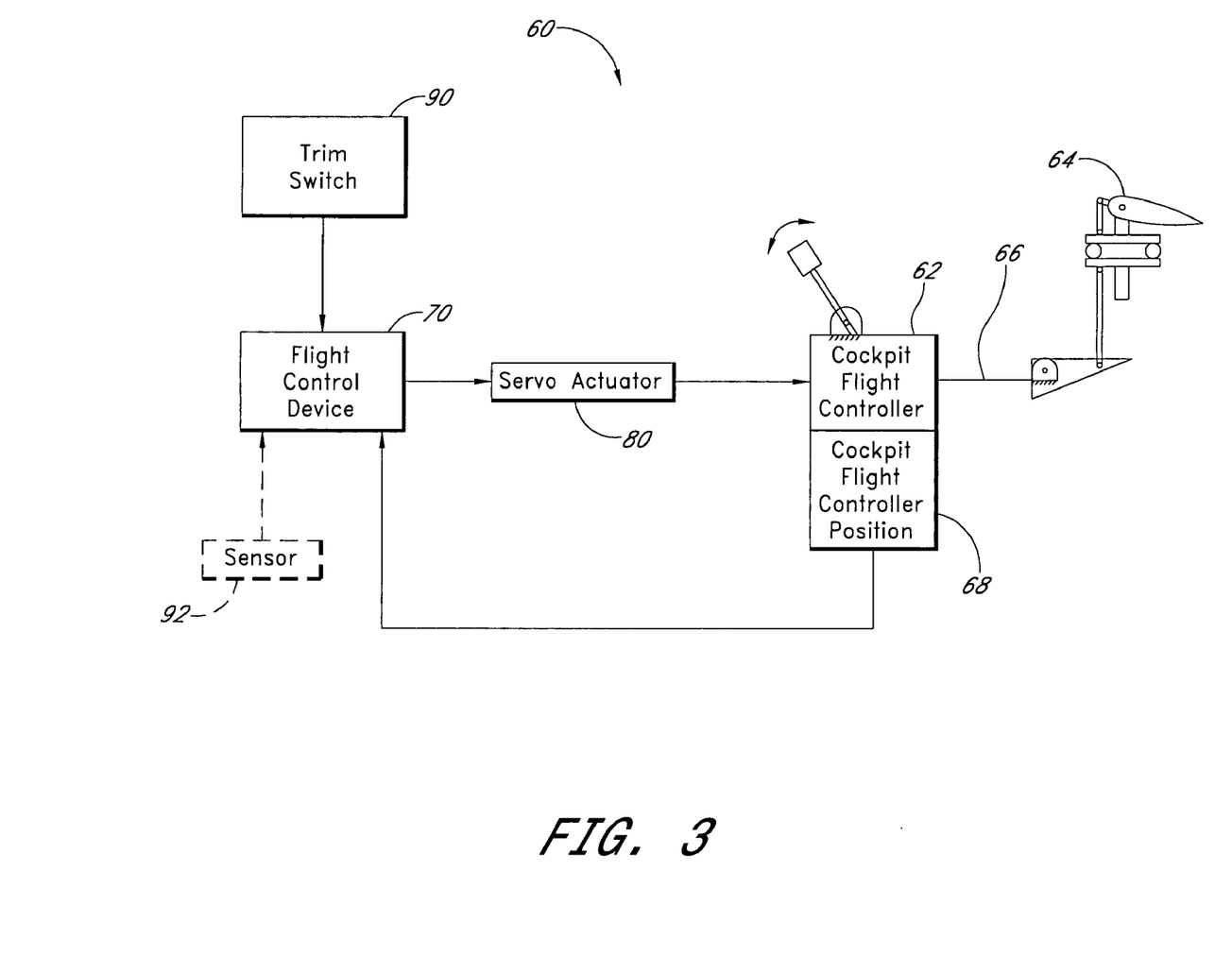
FIG. 3 is a block diagram of a system according to an embodiment of the invention.

FIG. 3 is a block diagram of a system 60 according to an embodiment of the invention. For purposes of discussion, and without limiting or construing the disclosure herein or the claims, the system 60 is described as implemented in an aircraft, such as a helicopter, airplane or the like. However, one skilled in the art will recognize that the system 60 may be implemented in a variety of parallel force-feel and SAS systems including, for example, automobiles, boats, other vehicles, other devices having a controller mechanically connected to a control surface, and the like.

The system 60 includes a cockpit-flight controller 62 configured to command a control surface 64 through a mechanical link 66. In a helicopter, for example, the cockpit-flight-controller 62 is configured to control the attitude of the helicopter in the pitch, roll and yaw axes. The system 60 is configured as a force-feel system that includes a feedback loop for providing tactile feedback to the cockpit-flight-controller 62. As discussed below, the tactile feedback is determined by a shaping function as a function of the position of the cockpit-flight-controller. In an embodiment, the system 60 is configured as a force-feel system and as a SAS. In such an embodiment, the tactile feedback is also based on signals provided by a stability augmentation system.

The system 60 includes a position sensor 68 coupled to a flight control device 70, which is in turn coupled to a servo-actuator 80. The flight control device 70 may be configured, for example, as a flight computer. The flight control device 70 comprises, by way of example, one or more processors, program logic, hardware, software, or other substrate configurations capable of representing data and instructions which operate as described herein or similar thereto. The flight control device 70 may also comprise controller circuitry, processor circuitry, processors, general purpose single-chip or multi-chip microprocessors, digital signal processors, embedded microprocessors, microcontrollers, combinations of the foregoing, or the like.

A trim switch 90 is coupled to the flight control device 70. In an embodiment, the trim switch 90 includes a momentary-on button located on the cockpit-flight-controller 62 such that it can be easily accessed by the pilot's thumb. The trim switch 90 is configured to allow the pilot to selectively reposition the cockpit-flight-controller 62 to a "commanded position." The position sensor 68 is configured to determine an actual position of the cockpit-flight-controller 62 relative to a predetermined position and to output a signal corresponding to the actual position.

The flight control device 70 is configured to receive the signal from the cockpit-flight-controller 62 and to command the control surface 64 through the servo-actuator 80 and the linkage 66. This feedback loop is configured to determine the forces felt at the cockpit-flight-controller 62 as a function of the position of the cockpit-flight-controller 62. The use of the servo-actuator 80 in the feedback loop around the cockpit-flight-controller 62 allows the position of the cockpit-flight-controller 62 to be trimmed in contrast to a conventional series mechanization that requires an additional trim-motor and a mechanical feel spring. In an embodiment of the invention, trim is accomplished by a command to the feedback loop that is generated by the pilot-activated trim switch 90.

The difference between the actual and commanded position of the cockpit-flight-controller 62 forms the feedback signal to the servo-actuator 80. The servo-actuator 80 converts this feedback signal to a force that resists any motion of the cockpit-flight-controller 62 away from the commanded position set by the pilot. In an embodiment, the resisting force on the cockpit-flight-controller 62 is applied as a non-linear function of the position of the cockpit-flight-controller 62. In an embodiment, the resisting force applied to the cockpit-flight-controller increases linearly as the position of the cockpit-flight-controller 62 is moved away from a neutral position.

The servo-actuator 80 is mechanically attached directly to the cockpit-flight-controller 62 resulting in a parallel mechanization for mechanically commanding the control surface 64. The parallel mechanization is configured to achieve a force-feel system that is acceptable to a pilot in that it provides tactile feedback to the cockpit-flight-controller 62 from the flight control device 70 while allowing the pilot to backdrive the servo-actuator 80.

In an embodiment, the system 60 is configured to operate as an autopilot. In such an embodiment, the flight control device 70 is configured to automatically command the control surface 64 proportional to autopilot error signals (not shown) which may include, for example, altitude error, rate-of-climb error, speed error, heading error, navigation error, or the like.

In an embodiment, the system 60 is configured to operate as a SAS. In such an embodiment, the flight control device 70 is configured to command the control surface 64 in response to SAS inputs. FIG. 3 illustrates an stability sensor 92 configured to provide SAS inputs to the flight control device 70. The sensor 92 comprises, by way of example, an attitude gyro, a rate gyro, an electronic device configured to simulate a gyro, or a combination of the foregoing. One skilled in the art will recognize that the sensor 92 may be configured, for example, to provide information related to attitude, rate, acceleration, or the like.

In an embodiment, the trim switch 90 is configured to activate the SAS. By way of a specific example, in one exemplary embodiment the pilot may activate the SAS by holding down the trim switch 90 for about 1.5 seconds. A delay of, for example, approximately 1.5 seconds is used to avoid accidentally activating the SAS. Using the trim switch 90 to activate the SAS eliminates the need for the pilot to remove his or her hand from the controls, which reduces workload. In an embodiment, a momentary button (not shown) is positioned near the trim switch 90 to allow the pilot to quickly disengage the SAS without removing his or her hand from the cockpit-flight-controller 62.

In an embodiment, the system 60 is configured to operate as a force-feel system and as a SAS. For example, in an exemplary embodiment the system 60 is configured as an inner loop for attitude stabilization wherein the sensor 92 is configured to provide attitude stabilization signals to the flight control device 70. The flight control device 70 is configured to command the control surface 64 in response to the attitude stabilization signals. The combination of the force-feel system and attitude feedback is referred to as an attitude-command-attitude-hold stability augmentation system.

Figure 4:
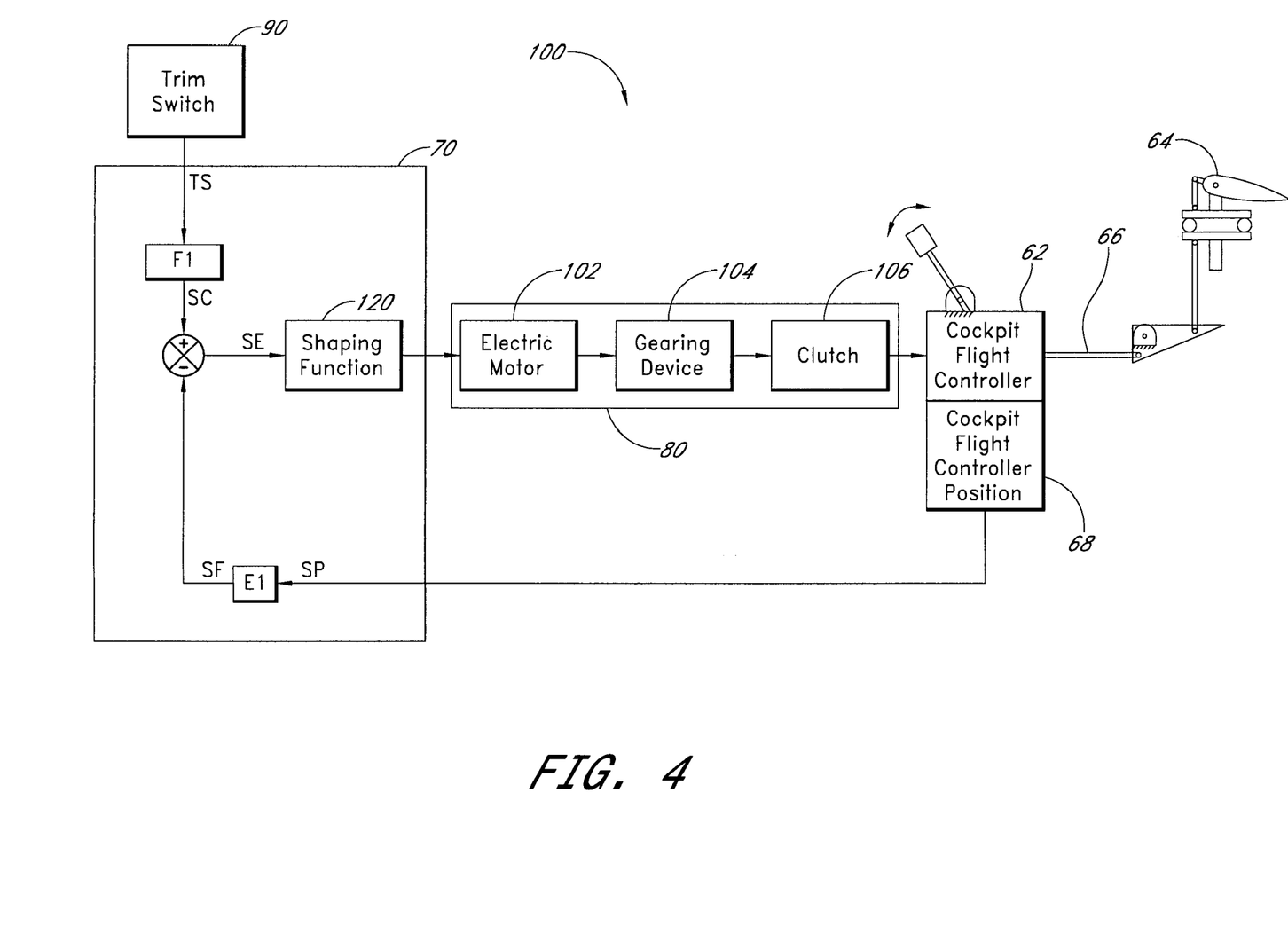
FIG. 4 is a schematic diagram illustrating a system 100 having a flight control device and a servo-actuator suitable for use with the system shown in FIG. 3, according to an embodiment of the invention.

FIG. 4 illustrates a system 100 having a flight control device 70 and a servo-actuator 80 suitable for use with the system 60 shown in FIG. 3, according to an embodiment of the invention. The servo-actuator 80 includes an electric motor 102, a gearing device 104, and a clutch 106. The gearing device 104 is configured to provide mechanical advantage between the electric motor 102 and the cockpit-flight-controller 62. Alternatively, the electric motor 102 has sufficient power to eliminate the need for the gearing device 104 or similar devices configured to achieve mechanical advantage. In an embodiment, the gearing device 104 has low-freeplay and a low gear ratio.

The clutch 106 is configured to connect and disconnect the force generated by the electric motor 102 to the cockpit-flight-controller 62 when the force-feel system is turned on and off. Alternatively, the clutch 106 is not needed when the force-feel system is turned on and off electronically, for example, by removing the input current to the electric motor 102. In an embodiment, the clutch 106 is configured to have approximately zero freeplay.

The low gear ratio allows the pilot to easily backdrive the flight controls during periods when the trim switch 90 is engaged, or if the SAS fails and the clutch 106 does not disengage. The latter feature is a safety aspect of the invention. In a preferred embodiment, the gear ratio is set so that 1 in-lb at the shaft of the electric motor 102 results in approximately 3.3 lbs of force at the cockpit-flight-controller 62, the freeplay is about zero, and the gearing device 104 is capable of being continuously back-driven without excessive wear.

The flight control device 70 comprises a shaping function 120 configured to command the forces felt at the cockpit-flight-controller 62 as a function of the deflection of the cockpit-flight-controller 62 from a commanded position set by the trim switch 90. The actual position of the cockpit-flight-controller 62 is determined by the position sensor 68. The desired force-feel characteristics result from the feedback loop around the cockpit-flight-controller 62 and by adjustments to the shaping function 120. In an embodiment, the shaping function 120 is tailored to ensure that the maximum continuous current limits of the electric motor 102 are not exceeded and to ensure that the stick force characteristics at the cockpit-flight-controller 62 are desirable to the pilot.

By way of specific example, an exemplary embodiment of the shaping function 120 is given in Table 1 for the pitch axis and Table 2 for the roll axis.

TABLE 1

Exemplary Shaping Function in Pitch

| Cockpit-Flight-Controller Deflection (Inches) | Force Applied at Cockpit Flight Controller (Pounds) |
|---|---|
| Minimum | −5.0 |
| −2.0 | −5.0 |
| −1.5 | −4.75 |
| −0.60 | −3.9 |
| −0.30 | −3.0 |
| −0.10 | −1.5 |
| 0.0 | 0.0 |
| 0.10 | 1.5 |
| 0.30 | 3.0 |
| 0.60 | 3.9 |
| 1.5 | 4.75 |
| 2.0 | 5.0 |
| Maximum | 5.0 |

TABLE 2

Exemplary Shaping Function in Roll

| Cockpit-Flight-Controller Deflection (Inches) | Force Applied at Cockpit Flight Controller (Pounds) |
|---|---|
| Minimum | −3.2 |
| −1.3 | −3.2 |
| −0.80 | −2.9 |
| −0.50 | −2.5 |
| −0.10 | −1.5 |
| 0.0 | 0.0 |
| 0.10 | 1.5 |
| 0.50 | 2.5 |
| 0.80 | 2.9 |
| 1.3 | 3.2 |
| Maximum | 3.2 |

Next, the operation of the system 100 shown in FIG. 4 will be described. As the pilot maneuvers the helicopter, the deflection of the cockpit-flight-controller 62 is determined by the position sensor 68. The position sensor 68 transmits a stick position signal SP corresponding to the deflection of the cockpit-flight-controller 62 to the flight control device 70. One skilled in the art will recognize that signals referred to within the flight control device 70 may include, for example, analog signals, digital signals, programming constants or variables, stored values, a combination of the forgoing, or the like. For example, the output of the position sensor 68 may be an analog signal that is converted to a digital signal or value by an analog-to-digital converter (not shown) before being processed by the flight control device 70.

The stick position signal SP is processed through an equalization algorithm E1 to provide damping. In an embodiment, the equalization algorithm E1 is a lead/lag network configured to provide stabilization to the feedback loop. The compensated output of the equalization algorithm E1 is the stick feedback signal SF.

When engaged, the trim switch 90 sends a trim switch signal TS to the flight control device 70. The trim switch signal TS is received by a function F1 which outputs a stick command signal SC. In an embodiment, the pilot engages the trim switch 90 when the cockpit-flight-controller 62 is in a desired position. When the trim switch 90 is released, the function F1 sets the stick command signal SC equal to the last value of the stick position signal SP. The stick command signal SC remains constant as long as the trim switch 90 is not engaged.

The input to the electric motor 102 is blended to zero when the trim switch 90 is engaged so that there is no force applied to the cockpit-flight-controller 62 by the servo-actuator 80 during this time. By way of specific example, in an exemplary embodiment blending to zero includes linearly decreasing the current supplied to the electric motor 102 over the course of approximately two seconds. During periods when the trim switch 90 is engaged, the pilot may move the cockpit-flight-controller 62 to a desired location by back-driving the gearing device 104 and electric motor 102. As discussed above, the low gear ratio of the gearing device 104 allows the pilot to back-drive the servo-actuator 80 without encountering objectionable forces. When the trim switch 90 is released, the input to the servo-actuator 80 is restored. This causes the servo-actuator 80 to apply forces to hold the cockpit-flight-controller 62 to the commanded position defined by the stick command signal SC.

The difference between the stick command signal SC and the stick feedback signal SF is defined as the stick error signal SE. The stick error signal SE is processed by the shaping function 120. The shaping function 120 is configured to "shape" or control the current supplied to the electric motor 102 such that the forces applied to the cockpit-flight-controller 62 are a function of the stick error signal SE, which in turn is proportional to the deflection of the cockpit-flight-controller 62. As discussed above, an exemplary shaping function 120 is provided in Table 1 and Table 2 in terms of the force commanded at the cockpit-flight-controller 62 and the deflection of the cockpit-flight-controller 62. In an embodiment, a calibration function (not shown) is configured to correlate the force commanded at the shaping function 120 to the current which drives the small and lightweight electric motor 102. The output of the electric motor 102 is mechanically coupled to the low-ratio, low-freeplay gearing device 104.

The output of the gearing device 104 is mechanically coupled to a zero-freeplay clutch 106. When the force-feel system is turned off, the clutch 106 disconnects the force-feel system from the helicopter flight control system. This allows the pilot to command the control surface 64 with the cockpit-flight-controller 62 without forces being applied to the cockpit-flight-controller 62 by the servo-actuator 80.

An alternate embodiment of the function F1 causes the stick command signal SC to monotonically increase in the same direction that the trim switch 90 is displaced. For this embodiment, the trim switch 90 is capable of being deflected fore-aft and left-right.

Figure 5:
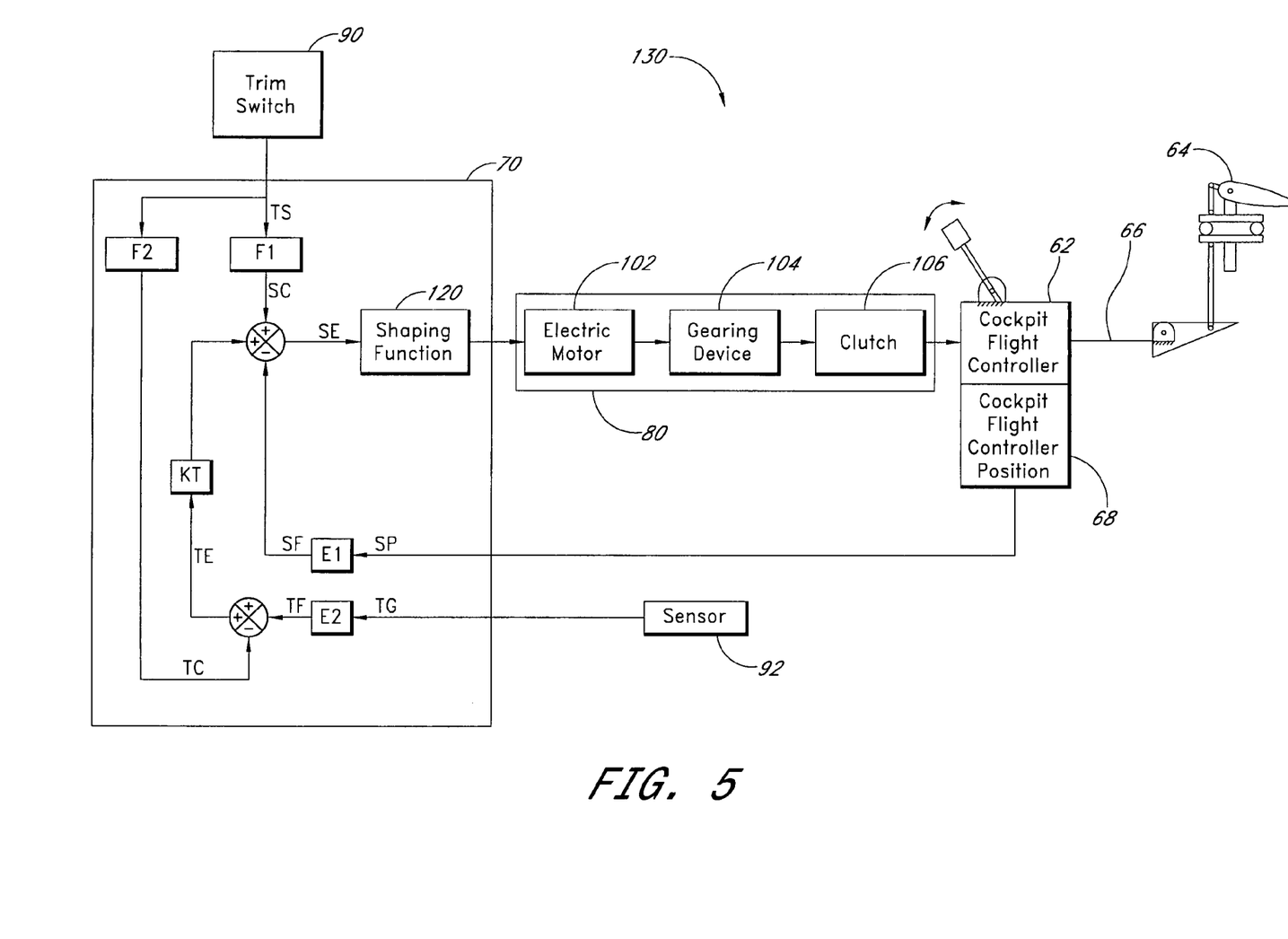
FIG. 5 is a schematic diagram illustrating a system having a flight control device, a servo-actuator and a sensor suitable for use with the system shown in FIG. 3, according to an embodiment of the invention.

FIG. 5 illustrates a system 130 having a flight control device 70, a servo-actuator 80, and a sensor 92 suitable for use with the system 100 shown in FIG. 4, according to an embodiment of the invention. The system 130 shown in FIG. 5 includes a force-feel system as described above in relation to FIG. 4 and an outer loop for feedback from the sensor 92. As discussed above, the sensor 92 comprises, by way of example, an attitude gyro, a rate gyro, an electronic device configured to simulate a gyro, or a combination of the foregoing.

By way of specific example, in an exemplary embodiment the sensor 92 provides an attitude feedback to provide an attitude-command-attitude-hold SAS. In an attitude-command-attitude-hold SAS, the sensor 92 includes an attitude gyro, or the like, and is configured to provide an attitude or "Theta Gyro" signal TG to the flight control device 70.

The Theta Gyro signal TG is processed by an equalization algorithm E2 to provide the compensation for a well-damped helicopter response in accordance with accepted practice, such as used in SASs and autopilots. In an embodiment, the equalization algorithm E2 is a lead/lag network configured to provide stabilization. The equalization algorithm E2 provides an attitude feedback or "Theta Feedback" signal TF.

When engaged, the trim switch 90 sends a trim switch signal TS to the flight control device 70. The trim switch signal is received by a function F2 which outputs a commanded attitude or "Theta Command" signal TC. In an embodiment, the function F2 tracks the current value of the Theta Gyro signal TG while the trim switch 90 is engaged. When the trim switch 90 is released, the function F2 sets the Theta Command signal TC to the last value of the Theta Gyro signal TG. The Theta Command signal TC remains constant as long as the trim switch 90 is not engaged.

An attitude error or "Theta Error" signal TE is calculated as the difference between the Theta Command signal TC and the Theta Feedback signal TF. In an embodiment, gain is added to the inner loop by multiplying the Theta Error signal TE by an attitude feedback function KT of a predetermined value. The Theta Error signal TE is then summed with the stick error SE signal and the combination is processed by the shaping function 120.

An alternate embodiment of the function F2 causes the Theta Command signal TC to monotonically increase in the direction that the trim switch 90 is displaced. For this embodiment, the trim switch 90 is capable of being deflected fore-aft and left-right.

In an embodiment of the invention, the sensor 92 is configured to provide both an attitude feedback signal and an attitude rate signal to the flight control device 70 to achieve adequate stability. Thus, for example, the sensor 92 may include an attitude gyro and a rate gyro to provide adequate stability to highly unstable helicopters.

In an embodiment, the force-feel system 130 shown in FIG. 5 is configured as a rate damper wherein the sensor 92 includes one or more rate gyros, or similar devices.

An embodiment of the invention includes configuring the system 130 shown in FIG. 5 as the inner loop for a combination of the above alternate embodiments by providing the pilot with selectable modes. Examples of selectable modes include force-feel, rate damper, attitude SAS, and the well-known autopilot modes such as altitude hold, heading hold, and navigation tracking.

The invention may be embodied in other specific forms without departing from the spirit or essential characteristics thereof. The present embodiments are therefore to be considered in all respects as illustrative and not restrictive. The scope of the invention being indicated by the appended claims, rather than by the foregoing description, and all changes which come within the meaning and the range of equivalency of the claims, are therefore intended to be embraced therein.

What is claimed is:

1. A force-feel system for providing tactile feedback to a cockpit-flight-controller mechanically coupled to a control surface in a helicopter which does not require apparatus to be inserted into a break in an existing flight control system and which does not require a mechanical spring and a trim-motor, thereby reducing the weight and cost of a force-feel system and making it practical to implement a force-feel system and a stability augmentation system in light-weight helicopters, the system comprising:

a feedback loop around a cockpit-flight-controller, the feedback loop configured to apply a force to the cockpit-flight-controller proportional to a deflection of the cockpit-flight-controller from a first position, the feedback loop including:

a position sensor configured to measure a second position of the cockpit-flight-controller;

a flight control device coupled to the position sensor, the flight control device configured to calculate the deflection and to determine the force based on a shaping function; and a servo-actuator mechanically connected to and in parallel with a flight control system, the servo-actuator configured to apply the force to the cockpit-flight-controller and to be back-driven by the cockpit-flight-controller.

2. The force-feel system of claim 1, further comprising an attitude sensor coupled to the flight control device to provide an indication of attitude, wherein the feedback loop is further configured to apply the force to the cockpit-flight-controller based on an attitude error.

3. The force-feel system of claim 1, wherein the position sensor is configured to measure the second position relative to the first position of the cockpit-flight-controller.

4. The force-feel system of claim 1, wherein the position sensor is configured to measure the actual position of the cockpit-flight-controller for at least one of the first position and the second position.

5. A force-feel system for providing tactile feedback to a cockpit-flight-controller mechanically coupled to a control surface in a helicopter which does not require apparatus to be inserted into a break in an existing flight control system, the system comprising:

a feedback loop around a cockpit-flight-controller, the feedback loop configured to apply a force to the cockpit-flight-controller proportional to a deflection of the cockpit-flight-controller from a first position, the feedback loop including:

a position sensor configured to measure a second position of the cockpit-flight-controller;

a flight control device coupled to the position sensor, the flight control device configured to calculate the deflection and to determine the force based on a shaping function; and a servo-actuator mechanically connected to and in parallel with a flight control system, the servo-actuator configured to apply the force to the cockpit-flight-controller and to be back-driven by the cockpit-flight-controller;

wherein the force-feel system does not include a mechanical spring or a trim motor.

* * * * *